United States Patent [19]
Hillrichs et al.

[11] Patent Number: 5,702,585
[45] Date of Patent: Dec. 30, 1997

[54] PROCESS OF PREPARING ALKALI PEROXIDE SOLUTIONS

[75] Inventors: Eilhard Hillrichs, Büdingen; Manfred Kienberger, Dietzenbach; Ulrich Sander, Friedrichsdorf, all of Germany

[73] Assignee: Metallgesellschaft Aktiengesellschaft, Frankfurt am Main, Germany

[21] Appl. No.: 535,129

[22] PCT Filed: Apr. 1, 1994

[86] PCT No.: PCT/EP94/01028

§ 371 Date: Nov. 16, 1995

§ 102(e) Date: Nov. 16, 1995

[87] PCT Pub. No.: WO94/24336

PCT Pub. Date: Oct. 27, 1994

[30] Foreign Application Priority Data

Apr. 8, 1993 [DE] Germany .............. 43 11 665.5

[51] Int. Cl.⁶ ...................................................... C25B 1/30
[52] U.S. Cl. ........................................... 205/468; 205/466
[58] Field of Search ............................. 205/465, 466, 205/467, 468, 471, 472, 510

[56] References Cited

U.S. PATENT DOCUMENTS

| | | | |
|---|---|---|---|
| 3,884,778 | 5/1975 | Eng et al. | 205/471 |
| 4,317,704 | 3/1982 | McIntyre | 205/763 |
| 4,357,217 | 11/1982 | Kuehn et al. | 205/466 |
| 4,384,931 | 5/1983 | Jasinski et al. | 204/84 |
| 4,431,494 | 2/1984 | McIntyre et al. | 205/465 |
| 4,693,794 | 9/1987 | Chiang | 205/347 |
| 4,758,317 | 7/1988 | Chiang | 205/468 |
| 4,872,957 | 10/1989 | Dong et al. | 205/468 |

Primary Examiner—Bruce F. Bell
Assistant Examiner—William T. Leader
Attorney, Agent, or Firm—Michael J. Striker

[57] ABSTRACT

The process of making an aqueous alkaline solution containing alkali hydroxide and hydrogen peroxide and having an alkali hydroxide/$H_2O_2$ molar ratio of 0.5 to 2.5 includes providing an electrochemical cell having a porous oxygen diffusion cathode, an anode and a cation exchange membrane separating an anode chamber containing the anode and a cathode chamber containing the cathode, providing a decomposition tank outside the electrochemical cell for receiving an aqueous starting solution containing at least one alkali sulfate, alkali hydrogen sulfate, alkali sulfite, alkali hydrogen sulfite, alkali carbonate and/or alkali hydrogen carbonate; feeding an alkali hydrogen sulfate-containing feed solution from the decomposition tank into the anode chamber, feeding an oxygen-containing gas to the cathode and feeding an alkali hydroxide-containing electrolyte into the cathode chamber; passing an electric current between the anode and the cathode to form alkali hydroxide and hydrogen peroxide at the cathode by cathodic reduction and to form sulfuric acid at the anode, withdrawing a sulfuric acid-containing solution from the anode chamber and feeding at least part of it into the decomposition tank together with the starting solution and withdrawing a product solution containing the alkali hydroxide and the hydrogen peroxide from the cathode chamber.

10 Claims, 4 Drawing Sheets

PROCESS OF PREPARING ALKALI PEROXIDE SOLUTIONS

This is a national stage application of PCT/EP94/01028, filed on Apr. 1, 1994.

BACKGROUND OF THE INVENTION

This invention relates to a process of preparing an aqueous alkaline peroxide solution having an alkali/$H_2O_2$ molar ratio of 0.5 to 2.5 in an electrochemical cell, which comprises a porous oxygen diffusion cathode, a cation exchange membrane, and an anode and in which a sulfuric acid-containing electrolyte is caused to flow through the anode chamber, an akali hydroxide-containing electrolyte is caused to flow through the cathode chamber, and alkali peroxide is formed in the alkali hydroxide-containing electrolyte by a reduction of oxygen at the cathode.

Peroxide solutions are increasing in importance as oxidizing and bleaching chemicals because the reaction product derived from the peroxide used as an oxidizing agent does not pollute the environment. For instance, alkaline aqueous hydroperoxide solutions are used to bleach woodpulp and paper. Hydrogen peroxide and sodium hydroxide solutions are used as starting materials for making the bleaching solution and are mixed to form sodium peroxide or sodium hydroperoxide in an aqueous solution. Because hydrogen peroxide is a relatively unstable compound and strict safety requirements must be met for its transportation, storage, and handling, it is much simpler and more desirable to prepare alkali peroxide solutions by electrochemical methods directly at the location at which they are to be used.

U.S. Pat. No. 4,693,794 describes an electrochemical process for the preparation of hydrogen peroxide in which carbon dioxide is removed from air and oxygen from the air is reduced to form hydrogen peroxide at a cathode which is contacted by a flow of an alkaline electrolyte. The electrochemical cell is divided by a membrane into an anode chamber and a cathode chamber.

U.S. Pat. No. 4,758,317 discloses a process for the preparation of hydrogen peroxide which is characterized in that oxygen is reduced to hydrogen peroxide at a cathode in the presence of an aqueous alkaline electrolyte in an electrochemical cell, which comprises a porous oxygen diffusion cathode and an anode and is divided by a membrane into a cathode chamber and an anode chamber.

U.S. Pat. No. 4,872,957 discloses a process of reacting a liquid with a gas in an electrochemical cell, which comprises a porous gas diffusion cathode, a microporous diaphragm, and an anode and in which an electrolyte is circulated.

U.S. Pat. No. 4,317,704 discloses for the operation of an electrochemical cell a process in which a gas-liquid mixture comprising an oxygen-containing gas and a catholyte is caused to flow through a cathode and part of the oxygen is reduced at the cathode.

U.S. Pat. No. 4,431,494 discloses the preparation of alkaline peroxide solutions by an electrochemical process which is characterized in that the aqueous alkaline electrolyte solution contains a complexing agent or a chelating agent in order to inhibit at least in part the catalytic influence of impurities on the decomposition of peroxide.

EP0 066 663 A1 discloses an electrochemical cell, which serves to prepare an alkaline peroxide solution and in which a solution which contains oxygen or air is caused to flow through a porous cathode so that oxygen is reduced. In that cell, the cathode chamber is separated from the anode chamber by a membrane.

U.S. Pat. No. 3,884,778 discloses a process for the preparation of hydrogen peroxide, aqueous alkali hydroxide solution, and aqueous sulfuric acid. This process is carried out in an electrochemical cell, which comprises three chambers and in which a sulfuric acid-containing aqueous solution is caused to flow between the anode and a semipermable anion-active membrane, water is caused to flow between a cathode and a semipermeable cation-active membrane, and an alkali sulfate solution is caused to flow through the intermediate chamber thus defined. In that process the application of an external voltage has the result that a persulfuric acid solution is formed at the anode and hydrogen and an aqueous alkali hydroxide solution are formed at the cathode. The persulfuric acid is subsequently reacted with water to form hydrogen peroxide and sulfuric acid.

U.S. Pat. No. 4,357,217 describe a process for the preparation of hydrogen peroxide in which an electrochemical cell is used, which comprises three chambers and in which an aqueous acidic solution is caused to flow between the anode and a cation exchange membrane, an aqueous alkaline solution is caused to flow between the anode and an anion exchange membrane and an aqueous solution is caused to flow in the intermediate chamber. In that process an oxygen-containing gas is fed to the gas diffusion cathode and an external voltage is applied to reduce the oxygen. As a result, peroxide is formed in the aqueous alkaline catholyte and water is oxidized in the aqueous alkaline anolyte at the same time to form hydrogen ions. The hydrogen ions and the peroxide ions migrate through the membranes into the intermediate chamber and react in the aqueous solution to form hydrogen peroxide, which is removed from circulation.

SUMMARY OF THE INVENTION

It is an object of the invention to provide a process of preparing an aqueous alkaline peroxide solution in an electrochemical cell, in which alkali peroxide is formed by a cathodic reduction of oxygen and the alkali hydroxide/$H_2O_2$ molar ratio is 0.5 to 2.5.

This is accomplished in accordance with the invention in what alkali hydrogen sulfate is contained in a circulating electrolyte and is derived from an aqueous solution of alkali sulfate or of alkali hydrogen sulfate or of a mixture of alkali sulfate and alkali hydrogen sulfate and an aqueous solution of sulfuric acid is prepared.

In an alternative in accordance with the invention alkali hydrogen sulfate is contained in a circulating electrolyte, and is derived from an aqueous solution of alkali sulfite or alkali hydrogen sulfite or a mixture of alkali sulfite and alkali hydrogen sulfite and the sulfuric acid formed at the anode is recycled to the decomposition tank in order to form pure gaseous sulfur dioxide.

In another alternative in accordance with the invention alkali hydrogen sulfate is contained in a circulating electrolyte and is derived from sulfuric acid and from an aqueous solution of an alkali carbonate or an alkali hydrogen carbonate or a mixture of alkali carbonate and alkali hydrogen carbonate and the sulfuric acid formed at the anode is recycled to the decomposition tank in order to form pure gaseous carbon dioxide.

The three alternative embodiments of the process in accordance with the invention afford the advantage that they permit the alkali hydroxide/$H_2O_2$ molar ratio to be kept below 2.5, preferably below 1.5. Another advantage afforded by these embodiments of the process resides in that salt solutions—i.e. solutions of alkali sulfates, alkali sulfites, and alkali carbonates—are used for a recovery of alkali hydroxides and may be used to recover alkali hydroxides. A final advantage afforded by the variants of the process resides in that, in addition, sulfuric acid can be derived from the alkali sulfites, gaseous sulfur dioxide can be derived from the alkali sulfites, and gaseous carbon dioxide can be derived from the alkali carbonates.

In a preferred embodiments of the invention, $Na_2SO_4$ or $K_2SO_4$ is used as an alkali sulfate, $NaHSO_4$ or $KHSO_4$ is used as an alkali hydrogen sulfate, $Na_2SO_3$ or $K_2SO_3$ is used as an alkali sulfite, $NaHSO_3$ or $KHSO_3$ is used as an alkali hydrogen sulfite, $Na_2CO_3$ or $K_2CO_3$ is used as an alkali carbonate, and $NaHCO_3$ or $KHCO_3$ is used as an alkali hydrogen carbonate.

In accordance with the invention, an aqueous alkali carbonate solution and/or alkali hydrogen carbonate solution is supplied to the circulating catholyte and an aqueous alkaline alkali percarbonate solution or a mixture of an alkali peroxide solution is produced.

In accordance with the invention, process water is supplied to the circulating catholyte to adjust the concentration of the alkaline solution of the peroxide end product.

According to a further feature of the invention, process water of an aqueous solution of alkali carbonate and/or alkali hydrogen carbonate is supplied to the circulating catholyte and the water or solution contains a chelating agent or salts thereof, whereby impurities are bound to metal ions to form non-ionized chelate complexes.

According to a further feature of the invention the chelating agent consists of ethylenediaminetetraacetic acid (EDTA) or its alkali salts.

In accordance with the invention the starting product solution is supplied to the circulating electrolyte to adjust the concentration of the alkaline solutions of the peroxide end product in a desirable manner.

According to a further feature of the invention, the oxygen diffusion cathode is supplied with air, from which the carbon dioxide has previously been removed.

According to a further embodiment of the invention the porous oxygen diffusion cathode consists of a carbon woven or nonwoven fabric, which is coated with a mixture of polytetrafluoroethene and carbon black.

According to a further feature of the invention an oxygen-evolving metal electrode or a catalyst coated metal electrode is used as an anode and the oxygen evolved at the anode is supplied to the oxygen diffusion cathode.

According to a further feature of the invention a titanium electrode, which is activated with a noble metal catalyst or coated with lead oxide, or a lead cathode is used as an oxygen-evolving metal electrode and, e.g., iridium or platinum is used as a noble metal for activating the electrode.

Also in accordance with the invention, a hydrogen diffusion anode is used as an anode and consists of a carbon woven or nonwoven fabric and a mixture of polytetrafluoroethene, carbon black, and noble metal and is gas-tightly covered by a proton-permeable membrane.

According to a further feature of the invention the cell is provided on the anode side in addition with an anion exchange membrane, an electrolyte which contains sulfuric acid and sodium hydrogen sulfate is caused to flow through the intermediate chamber between the cation exchange membrane and the anion exchange membrane, the sulfuric acid is caused to flow through the anode chamber, which is bounded by the anion exchange membrane, and a partial stream is withdrawn from said sulfuric acid.

According to a further feature of the invention, a cation exchange membrane is additionally provided in the cell on the anode side, an electrolyte which contains sulfuric acid and sodium hydrogen sulfate is caused to flow through the anode chamber, and the alkaline peroxide solution formed in the cathode chamber is caused to flow through the intermediate chamber between the two cation exchange membranes, whereby the alkali hydroxide/$H_2O_2$ molar ratio is decreased.

In accordance with the invention the concentration of free sulfuric acid is maintained between 0 and 30% by weight, the concentration of alkali sulfate in the alkali hydrogen sulfate-containing electrolyte is maintained between 1 and 35% by weight and a current density between 0.5 and 3 $KA/m^2$, preferably between 1 and 2 $kA/m^2$ is adjusted so that the composition of the alkaline product solution in the circulating catholyte is maintained in the range from 1 to 5 moles alkali per liter and in the range from 0.4 to 3 moles peroxide per liter.

Also in accordance with the invention the starting material consists of a sodium carbonate-containing aqueous solution of an alkali sulfate and/or an alkali hydrogen sulfate or of an alkali sulfite and/or of an alkali hydrogen sulfite, which solution may be contaminated by polyvalent cations and other mineral components and has a pH between 8 and 13 and a salt concentration between 10% by weight and the solubility limit of the starting material. The aqueous solution of the starting material is subsequently filtered and the filtrate at a pH from 8 to 13 is caused to flow in contact with a selective cation exchange material for an absorption of divalent and polyvalent cations. The solution is supplied to the decomposition tank, the sulfuric acid-containing anolyte coming from the electrochemical cell is simultaneously supplied to the decomposition tank, and after an outgassing to remove sulfur dioxide and/or car con dioxide the resulting sulfuric acid solution, which contains alkali sulfate and alkali hydrogen sulfate, is supplied as an anolyte to the electrochemical cell.

According to a further feature of the invention the sodium carbonate-containing mineral or the sodium carbonate-containing solids which are formed by a thermal de-composition of a peroxide bleaching liquor used to bleach paper or woodpulp is used as the starting material for preparing the sodium carbonate-containing solution.

BRIEF DESCRIPTION OF THE DRAWINGS

The subject matter of the invention will be explained more in detail hereinafter with reference to the drawings (FIGS. 1 to 4).

DESCRIPTION OF THE PREFERRED EMBODIMENTS

Figure 1:
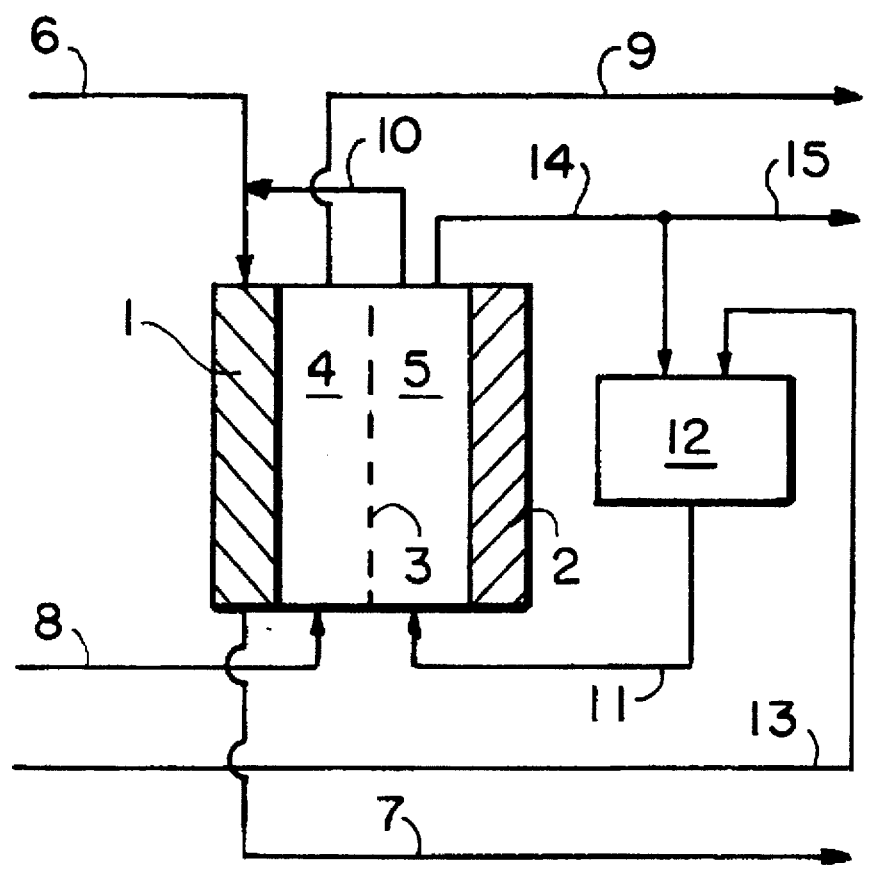
FIG. 1 is a diagrammatic illustration of the electrolytic cell together with the associated lines and a decomposition tank. The cell comprises a cathode an anode, and a cation exchange membrane, and is operated to produce as an additional product a salt-containing aqueous sulfuric acid solution.

FIG. 1 shows the electrolytic cell, which comprises an oxygen diffusion cathode 1, an anode 2 and a cation exchange membrane 3, by which the cell is divided into a cathode chamber 4 and an anode chamber 5. The cathode is composed of two perforated nickel plates, between which a porous carbon woven fabric having a thickness of about 0.4 mm and coated with a mixture of polytetrafluoroethene and carbon black is disposed. Oxygen or air under a pressure of 0.02 to 0.1 bar is supplied through a line 6 to the rear side of that oxygen diffusion cathode 1. The oxygen diffusion cathode is de-aerated through a line 7. The front side of that cathode is wetted by the catholyte, which is supplied with process water through a line 8 and from which the alkaline solution of the end product consisting of an alkaline peroxide solution is withdrawn through a line 9. The anode 2 consists of an iridium-activated expanded metal anode made of titanium or of a hydrogen diffusion anode made of a carbon woven fabric, which is coated with a mixture of polytetrafluoroethene and carbon black and is additionally activated with a platinum catalyst. The rear surface of the carbon woven fabric of the hydrogen diffusion anode is forced against a sheet of corrosion-resisting steel. The front surface of the woven fabic is covered with a proton-permeable cation exchange membrane (e.g., NaFION 117, DuPont, U.S.A.) in order to separate the hydrogen space of the anode from the anolyte. Hydrogen is supplied under a pressure of 0.02 to 0.1 bar to the carbon woven fabric on the rear of the anode. The oxygen evolved at the iridium-activated titanium anode is supplied in a line 10 to the oxygen diffusion cathode 1. The $NaHSO_4$-containing solution flows from the decomposition tank 12 through a line 11 to the anode chamber 5. The starting materials are fed through a line 13 to the decomposition tank 12. The anolyte leaving the anode chamber 5 is supplied through a line 14 to the decomposition tank 12 and a partial stream of the anolyte is withdrawn through a line 15 as a further product solution. The electrolysis is carried out at temperatures from 20° to 50° C.

Figure 2:
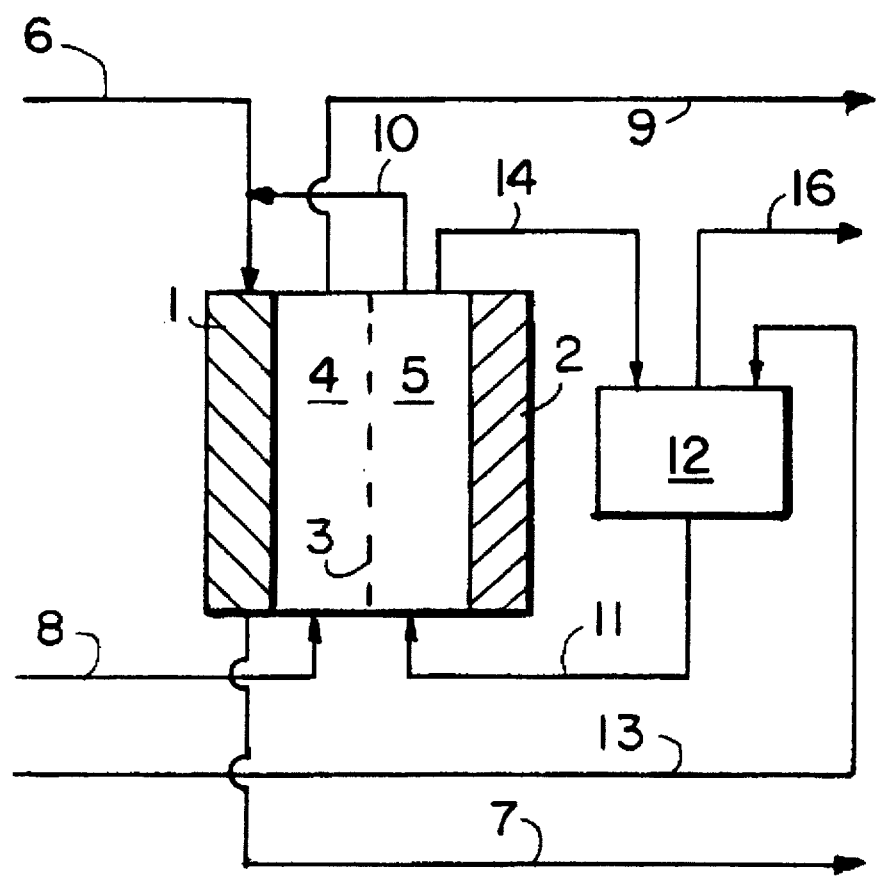
FIG. 2 is a diagrammatic illustration of the electrolytic cell together with the associated lines and a decomposition tank. The cell comprises a cathode, an anode, and a cation exchange membrane, and is operated to produce as an additional product a gaseous substance.

The electrolytic cell shown in FIG. 2 differs from that shown in FIG. 1 in that a gaseous substance rather than a liquid product is produced as an additional product and is withdrawn through line 16 from the decomposition tank 12.

Figure 3:
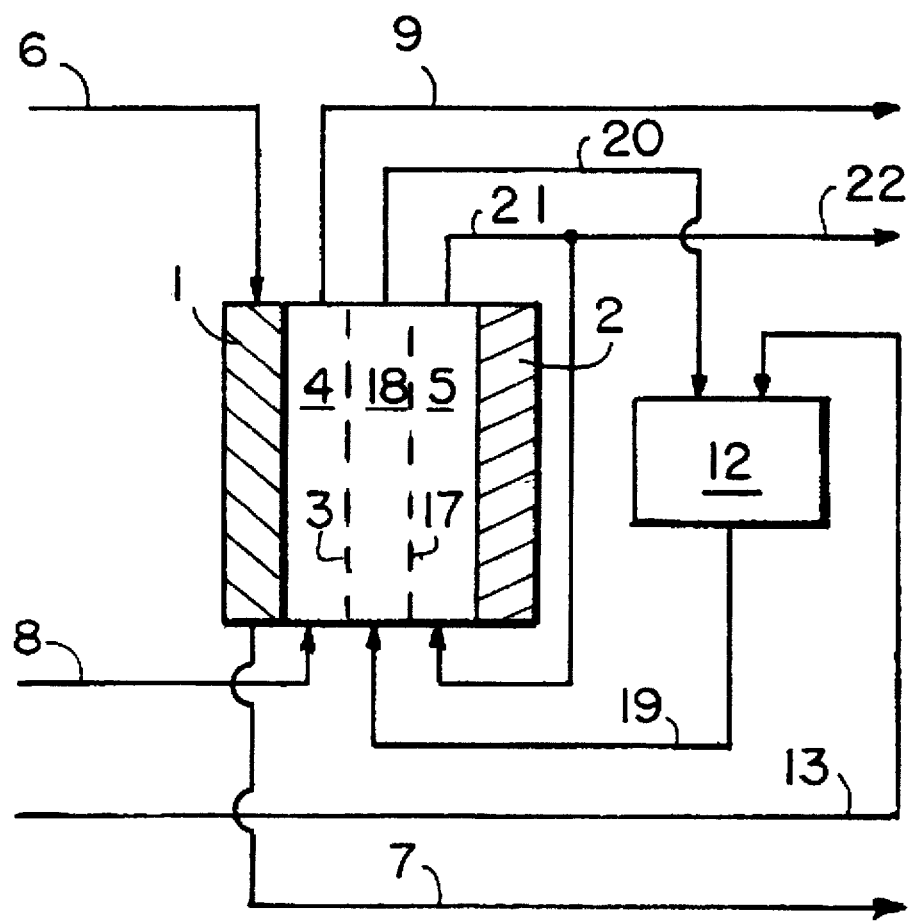
FIG. 3 is a diagrammatic illustration of the electrolytic cell together with the associated lines and a decomposition tank. The cell comprises a cathode, an anode, and cation exchange membrane, and is operated to produce as an additional product an aqueous sulfuric acid solution.

The electrolytic cell shown in FIG. 3 differs from that shown in FIG 1 in that an additional anion exchange membrane 17 is provided in front of the anode 2 so that an intermediate chamber 18 is defined. The $NaHSO_4$-containing solution flows through a line 19 from the decomposition tank 12 to the intermediate chamber 18. The starting materials are fed through a line 13 into the decomposition tank 12. The solution leaving the intermediate chamber 18 is supplied through a line 20 to the decomposition tank 12. The anolyte is circulated in a line 21, from which an almost entirely salt free product solution is withdrawn through a line 22.

Figure 4:
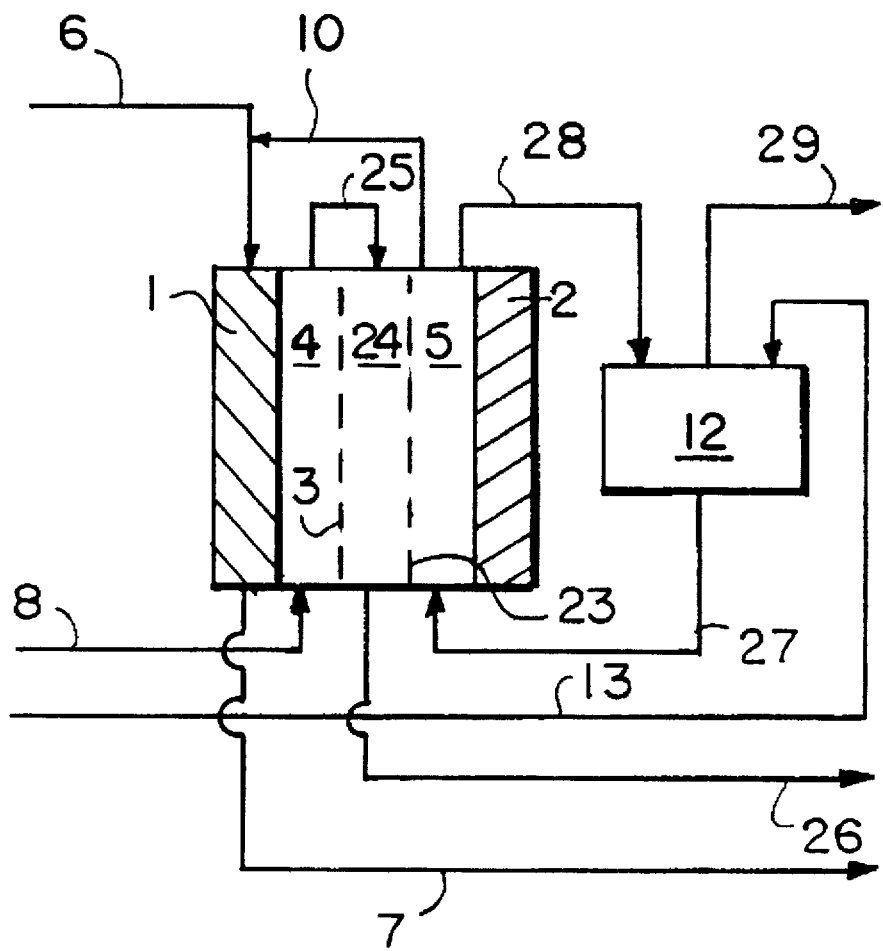
FIG. 4 is a diagrammatic illustration of the electrolytic cell together with the associated lines and a decomposition tank. The cell comprises a cathode, an anode, and a cation exchange membrane, and an additional product consisting of a gaseous substance is produced in the decomposition tank.

The electrolytic cell shown in FIG. 4 differs from the one shown in FIG. 2 in that an additional cation exchange membrane 23 is provided in front of the anode 2 so that an intermediate chamber 24 is defined. The catholyte is supplied through a line 25 to the intermediate chamber 24 and the solution leaving the intermediate chamber is withdrawn as a product from the cell through a line 26. The $NaHSO_4$-containing solution flows through a line 27 from the decomposition tank 12 into the anode chamber 5. The starting materials are fed through a line 13 to the decomposition tank 12. The solution leaving the anode chamber 5 is supplied through a line 28 to the decomposition tank 12, from which a gaseous substance is withdrawn as an additional product through a line 29.

The invention will be described in more detail hereinafter with reference to examples.

EXAMPLES

Example 1 (see FIG. 1):

The electrolytic cell comprises an oxygen diffusion cathode 1, an iridium-activated titanium anode 2, and a cathode exchange membrane 3. The anolyte consists of an aqueous sulfuric acid $NaHSO_4$ solution, which contains 40 g/l $H_2SO_4$ and 150 g/l $Na_2SO_4$ and is circulated through lines 11 and 14 and through a decomposition tank 12, which is fed with the $Na_2SO_4$ starting solution through a line 13. The products obtained in the catholyte in case of an electric current of 10 A per 100 $cm^2$ electrode surface area consist of 5.1 g/h peroxide (0.15 mole/h at a current efficiency of 81%) and of 6.7 g/h NaOH (0.168 mole/n at a current efficiency of 45%) and are withdrawn from the cell through line 9. This corresponds to an $NaOH/H_2O_2$ molar ratio of 1.12. At a current density of 1 $kA/m^2$ the cell voltage will be 2.4 V if pure oxygen is supplied to the gas diffusion cathode and will be 2.8 V if air is supplied to the gas diffusion cathode.

The concentration of $Na_2SO_4$ in the anolyte decreases by 12 g/h because 0.168 mole/h sodium ions and 0.205 mole/h protons migrate from the anolyte through the membrane into the catholyte. Because 0.373 mole/h protons is formed at the anode at the same time, the acidity of the anolyte is initially increased. To maintain the concentration of $Na_2SO_4$ and $H_2SO_4$ in 5 liters electrolyte, 200 ml/h of an aqueous solution containing 210 g/l $Na_2SO_4$ are supplied to the decomposition tank 12 through a line 13 and a product solution which contains 150 g/l $Na_2SO_4$ and 40 g/l $H_2SO_4$ is withdrawn at the same volume rate from the circulating anolyte through a line 15.

Examples 2 and 3 (see FIG. 2):

A difference from Example 1 resides in that the concentrations of 150 g/l $Na_2SO_4$ and 40 g/l $H_2SO_4$ in the $NaHSO_4$ solution are maintained constant in that 0.045 l/h of 17% aqueous solution of $Na_2CO_3$ is supplied to the decomposition tank 12. 1.88 l/h (3.7 g/h) $CO_2$ are formed as an additional product, which is withdrawn from the decomposition tank through a line 16.

If the concentration of the $NaHSO_4$ is maintained constant in that 0.025 l/h of a 40% solution of $Na_2SO_3$ is supplied to the decomposition tank 12, 1.88 l/h (5.4 g/h) $SO_2$ will be formed as an additional product, which is withdrawn from the decomposition tank through a line 16.

Example 4 (see FIG. 3):

The electrolytic cell comprises an oxygen diffusion cathode 1, an iridium-activated titanium anode 2, a cation exchange membrane 3 and an additional anion exchange membrane 17 (e.g., Type AMH, Tokuyama Soda, Japan) in front of the anode. A solution containing 150 g/l $Na_2SO_4$ and 40 g/l $H_2SO_4$ is circulated through the intermediate chamber 18 between the cation and anion exchange membranes and through lines 20 and 21 and a decomposition tank 12, which is supplied with the starting $Na_2SO_4$ solution through a line 13. The anolyte is circulated in a line 21, from which a solution of 110 g/l sulfuric acid is withdrawn as an additional product through a line 22. A solution containing 70 g/l NaOH and 50 g/l peroxide is formed as a product in the catholyte and is withdrawn from the cell through a line 9. The $NaOH/H_2O_2$ molar ratio is 1.2. In case of a current density of 1 kA/m² the cell voltage will amount to 3.1 V if oxygen is supplied to the cathode and will amount to 3.4 V if air is supplied to the cathode.

If the expanded metal anode 2 is replaced by a hydrogen diffusion anode, the cell voltage will be 1.7 V if the current density is 1 kA/m² and oxygen is supplied to the cathode. No oxygen is evolved at the anode.

Examples 5 and 6 (FIG. 4):

The electrolytic cell comprises an oxygen diffusion cathode 1, an iridium-activated titanium anode 2, a cation exchange membrane 3 and an additional cation exchange membrane 23 (e.g., NaFION 324, DuPont, U.S.) in front of the anode. The catholyte is supplied through a line 25 to the intermediate chamber 24 between the two cation exchange membranes. A solution, which contains 70 g/l NaOH and 50 g/l peroxide, is subsequently withdrawn from the cell through a line 26. The anolyte is circulated through lines 28 and 27 and a decomposition tank 12, which is supplied with the $Na_2SO_3$ solution or the $Na_2CO_3$ solution through a line 13 and from which gaseous $SO_2$ or $SO_2$ is withdrawn as an additional product through a line 29. At a current density of 1 kA/m² a cell voltage of 3.2 V will be obtained if oxygen is supplied to the cathode. The term "alkali sulfate-alkali hydrogen sulfate mixture" in the appended claims means a mixture of an alkali sulfate and an alkali hydrogen sulfate. Similarly the term "alkali sulfite-alkali hydrogen sulfite mixture" in the appended claims means a mixture of an alkali sulfite and an alkali hydrogen sulfite and the term "alkali carbonate-alkali hydrogen carbonate mixture" means a mixture of an alkali carbonate and an alkali hydrogen carbonate.

We claim:

1. A process of preparing an aqueous alkaline solution containing alkali hydroxide and hydrogen peroxide and having an alkali hydroxide/$H_2O_2$ molar ratio of 0.5 to 2.5, said process comprising the steps of:

a) providing an electrochemical cell having an anode chamber containing an anode and an anolyte, a cathode chamber containing a porous oxygen diffusion cathode and a catholyte, and a cation exchange membrane between the anode chamber and the cathode chamber, and providing a decomposition tank outside the electrochemical cell for receiving an aqueous starting solution containing at least one alkali salt selected from the group consisting of alkali sulfates, alkali hydrogen sulfates, alkali sulfites, alkali hydrogen sulfites, alkali carbonates and alkali hydrogen carbonates;

b) feeding said aqueous starting solution to the decomposition tank, feeding an alkali hydrogen sulfate-containing feed solution from the decomposition tank into the anode chamber to provide the anolyte, feeding an oxygen-containing gas to the porous oxygen diffusion cathode and feeding an alkali hydroxide-containing solution into the cathode chamber to provide the catholyte;

c) after step b), passing an electric current between the anode and the cathode to form said hydrogen peroxide and said alkali hydroxide in the catholyte by cathodic reduction and to form sulfuric acid in the anolyte; and d) withdrawing a sulfuric acid-containing solution from the anolyte in the anode chamber, feeding at least part of the sulfuric acid-containing solution from the anode chamber into the decomposition tank together with the starting solution and withdrawing the aqueous alkaline solution containing the hydrogen peroxide and the alkali hydroxide from the catholyte as a product solution.

2. The process as defined in claim 1 wherein the aqueous starting solution fed to the decomposition tank contains at least one sulfite member selected from the group consisting of alkali sulfites and alkali hydrogen sulfites, and further comprising forming gaseous sulfur dioxide in the decomposition tank from the aqueous starting solution and the sulfuric acid-containing solution fed to the decomposition tank and withdrawing said sulfur dioxide from the decomposition tank.

3. The process as defined in claim 1, wherein the aqueous starting solution fed to the decomposition tank contains at least one carbonate member selected from the group consisting of alkali carbonates and alkali hydrogen carbonates, and further comprising forming gaseous carbon dioxide in the decomposition tank from the aqueous starting solution and the sulfuric acid-containing solution fed to the decomposition tank and withdrawing said carbon dioxide from the decomposition tank.

4. The process as defined in claim 1, further comprising the steps of:

a) forming a sodium carbonate-containing solid from a peroxide bleaching liquor used to bleach paper or wood pulp by thermal decomposition and forming a sodium carbonate-containing aqueous solution from said sodium carbonate-containing solid;

b) subsequently filtering said sodium carbonate-containing aqueous solution to form a filtrate flow and contacting the filtrate flow at a pH of from 8 to 13 with a selective cation exchange material for absorption of divalent cations and polyvalent cations in said sodium carbonate-containing aqueous solution to form a filtered solution;

c) feeding the sulfuric acid-containing solution and the filtered solution simultaneously into the decomposition tank; and d) outgassing the decomposition tank to remove a product gas comprising at least one of sulfur dioxide and carbon dioxide and to form a sulfuric acid-containing product solution.

5. The process as defined in claim 1, further comprising supplying an aqueous solution of a chelating agent to the catholyte in the cathode chamber to bind process impurities.

6. The process as defined in claim 1, wherein said oxygen diffusion cathode consists of a woven or nonwoven carbon fabric and a coating of a mixture of polytetrafluoroethene and carbon black and said anode is a member selected from the group consisting of an oxygen-evolving metal electrode and a catalyst-coated metal electrode, and further comprising supplying oxygen evolved at the anode to the cathode.

7. The process as defined in claim 1, wherein said anode is a hydrogen diffusion anode comprising a woven or nonwoven carbon fabric and a mixture of polytetrafluoroethene, carbon black and noble metal, and said hydrogen diffusion anode is gas-tightly covered by a proton permeable membrane.

8. The process as defined in claim 1, wherein the electric current produces a current density of from 0.5 to 3 kA/m² in the electrochemical cell between the cathode and the anode.

9. A process of preparing an aqueous alkaline solution containing alkali hydroxide and hydrogen peroxide and having an alkali hydroxide/$H_2O_2$ molar ratio of 0.5 to 2.5, said process comprising the steps of:

a) providing an electrochemical cell divided into an anode chamber containing an anode and an anolyte, a cathode chamber containing a porous oxygen diffusion cathode and a catholyte, and an intermediate chamber between the cathode chamber and the anode chamber containing an intermediate solution, said electrochemical cell having an anion exchange membrane separating the anode chamber from the intermediate chamber and a cation exchange membrane separating the cathode chamber from the intermediate chamber, and providing a decomposition tank outside the electrochemical cell for receiving an aqueous starting solution containing at least one alkali salt selected from the group consisting of alkali sulfates, alkali hydrogen sulfates, alkali sulfites, alkali hydrogen sulfites, alkali carbonates and alkali hydrogen carbonates;

b) feeding said aqueous starting solution to the decomposition tank, feeding an alkali hydrogen sulfate-containing feed solution from the decomposition tank into the intermediate solution in the intermediate chamber, feeding an oxygen-containing gas to the porous oxygen diffusion cathode and feeding an alkali hydroxide-containing solution into the catholyte in the cathode chamber;

c) passing an electric current between the anode and the cathode to form said hydrogen peroxide and said alkali hydroxide in the catholyte by cathodic reduction and to form sulfuric acid in the anolyte; and d) withdrawing a portion of the anolyte from the anode chamber, feeding said portion of the anolyte back into the anolyte in the anode chamber, withdrawing another portion of the anolyte from the anode chamber as a by-product solution containing the sulfuric acid, withdrawing a portion of the intermediate solution in the intermediate chamber and feeding said portion of the intermediate solution into the decomposition tank and withdrawing a portion of the catholyte from the cathode chamber to form the aqueous alkaline solution containing the alkali hydroxide and the hydrogen peroxide.

10. A process of preparing an aqueous alkaline solution containing alkali hydroxide and hydrogen peroxide and having an alkali hydroxide/$H_2O_2$ molar ratio of 0.5 to 2.5, said process comprising the steps of:

a) providing an electrochemical cell having an anode chamber containing an anode and an anolyte, a cathode chamber containing a porous oxygen diffusion cathode and a catholyte, an intermediate chamber between the anode chamber and the cathode chamber, said intermediate chamber containing an intermediate solution, and a cation exchange membrane separating the anode chamber from the intermediate chamber and another cation exchange membrane separating the cathode chamber from the intermediate chamber, and providing a decomposition tank outside the electrochemical cell for receiving an aqueous starting solution containing at least one alkali salt selected from the group consisting of alkali sulfates, alkali hydrogen sulfates, alkali sulfites, alkali hydrogen sulfites, alkali carbonates and alkali hydrogen carbonates;

b) feeding said aqueous starting solution to the decomposition tank, feeding an alkali hydrogen sulfate-containing feed solution from the decomposition tank into the anolyte in the anode chamber, feeding an oxygen-containing gas to the porous oxygen diffusion cathode and feeding an alkali hydroxide-containing electrolyte into the catholyte in the cathode chamber;

c) passing an electric current between the anode and the cathode to form the hydrogen peroxide and the alkali hydroxide in the catholyte by cathodic reduction and to form sulfuric acid in the anolyte; and d) withdrawing a portion of the anolyte from the anode chamber as a sulfuric-acid containing solution, feeding said portion of the sulfuric acid-containing solution into the decomposition tank together with the aqueous starting solution and feeding a portion of the catholyte containing the alkali hydroxide and the hydrogen peroxide into the intermediate chamber and withdrawing a portion of the intermediate solution in the intermediate chamber as the aqueous alkaline solution containing the alkali hydroxide and the hydrogen peroxide.

* * * * *